(12) United States Patent
Hwang et al.

(10) Patent No.: US 12,229,981 B2
(45) Date of Patent: Feb. 18, 2025

(54) MOBILE TERMINAL AND OPERATING METHOD THEREOF

(71) Applicant: LG ELECTRONICS INC., Seoul (KR)

(72) Inventors: Sungmok Hwang, Seoul (KR); Jinok Kim, Seoul (KR); Yeonkyung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 17/879,201

(22) Filed: Aug. 2, 2022

(65) Prior Publication Data

US 2023/0058043 A1 Feb. 23, 2023

(30) Foreign Application Priority Data

Aug. 19, 2021 (KR) .................. 10-2021-0109441

(51) Int. Cl.
*G06T 7/62* (2017.01)
(52) U.S. Cl.
CPC ...... *G06T 7/62* (2017.01); *G06T 2207/20224* (2013.01); *G06T 2207/30204* (2013.01)

(58) Field of Classification Search
CPC ............. G06T 7/62; G06T 2207/20224; G06T 2207/30204
See application file for complete search history.

(56) References Cited

U.S. PATENT DOCUMENTS

| 2015/0243016 A1* | 8/2015 | Moteki | ..................... G06T 7/70 |
| | | | 382/103 |
| 2022/0124447 A1* | 4/2022 | Patil | ........................ H04S 7/302 |

FOREIGN PATENT DOCUMENTS

JP 2019077200 * 5/2019 ............. G01B 11/00

* cited by examiner

*Primary Examiner* — Myron Wyche
(74) *Attorney, Agent, or Firm* — KED & ASSOCIATES, LLP (57) ABSTRACT

A mobile terminal may include a camera, a display unit, and a processor configured to: determine whether two markers attached to two doors are present from an image captured through the camera; when the two markers are present, acquire center points of the two markers; acquire a y-axis pixel distance difference between the acquired center points; and estimate a height difference between the two doors based on the acquired y-axis pixel distance difference.

17 Claims, 12 Drawing Sheets

MOBILE TERMINAL AND OPERATING METHOD THEREOF

CROSS-REFERENCE TO RELATED APPLICATION

The present application claims priority under 35 U.S.C. 119 and 35 U.S.C. 365 to Korean Patent Application No. 10-2021-0109441, filed on Aug. 19, 2021, which is hereby incorporated by reference in its entirety.

BACKGROUND

1. Field

The present disclosure relates to estimation of a height difference occurring during a process of installing a home appliance.

2. Background

When a home appliance is delivered to a customer, an installer checks whether the appliance is properly installed. In particular, in the case of a home appliance having a plurality of doors, such as a refrigerator, an installer uses a level aligner to check whether the left and right height difference is correct or check the presence or absence of a height difference.

In some cases, an installer sets a level aligner and then takes a picture to check a height difference. However, there is a problem in that the time for the installer to check the height difference, such as the time to set the level aligner, the time to check the focus after taking a picture, the time to arrange the level aligner, etc. is lengthened.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
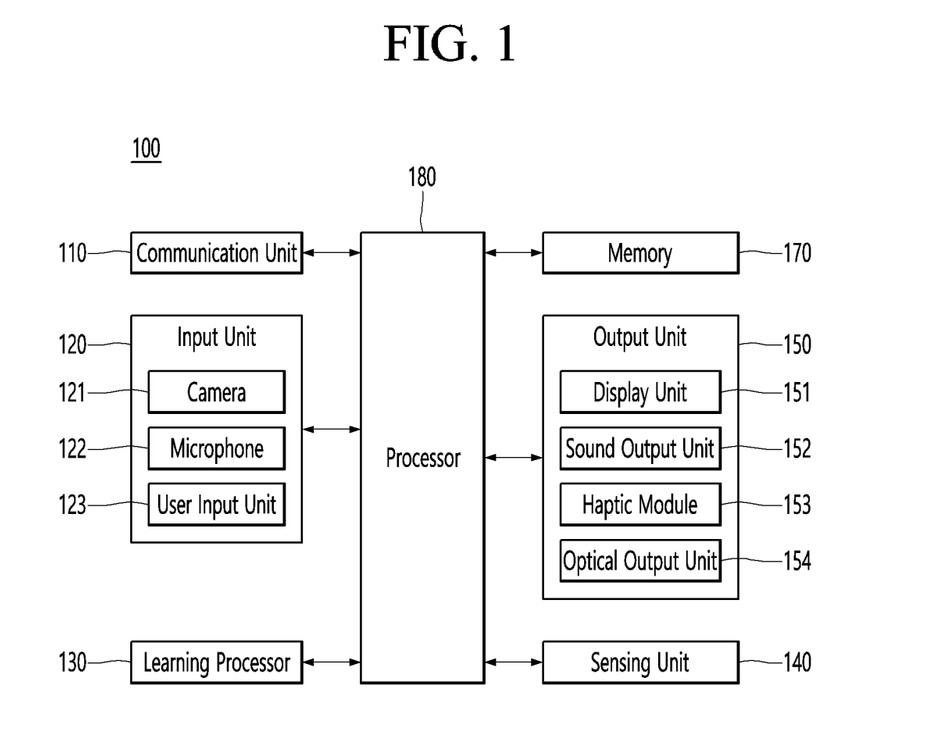
FIG. 1 is a diagram for describing a configuration of a mobile terminal according to an embodiment of the present disclosure.

FIG. 1 is a diagram for describing a configuration of a mobile terminal according to an embodiment of the present disclosure. Referring to FIG. 1, a terminal 100 may include a communication unit 110, an input unit 120, a learning processor 130, a sensing unit 140, an output unit 150, a memory 170, and a processor 180.

The communication unit 110 may transmit and receive data to and from external devices, such as other artificial intelligence (AI) devices 100a to 100e or an AI server 200, by using wired/wireless communication technology. For example, the communication unit 110 may transmit and receive sensor information, a user input, a learning model, a control signal, and the like to and from the external devices.

In this case, the communication technology used by the communication unit 110 includes Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The input unit 120 may acquire various types of data. In this case, the input unit 120 may include a camera 121 for inputting an image signal, a microphone 122 for receiving an audio signal, a user input unit 123 for receiving information from a user, and the like. By treating the camera 121 or the microphone 122 as a sensor, a signal acquired from the camera 121 or the microphone 122 may be referred to as sensing data or sensor information.

The input unit 120 may acquire training data for model learning, input data to be used to acquire an output using the learning model, and the like. The input unit 120 may acquire raw input data. In this case, the processor 180 or the learning processor 130 may extract an input feature by preprocessing the input data.

The camera 121 processes image frames of still images or moving images acquired by image sensors in a video call more or an image capture mode. The processed image frames may be displayed on the display unit 151 or may be stored in memory 170.

The microphone 122 processes an external sound signal into electrical voice data. The processed voice data may be utilized in various ways according to a function being executed by the AI device 100 (or a running application program). On the other hand, various noise cancellation algorithms for canceling noise occurring in a process of receiving an external sound signal may be applied to the microphone 122.

The user input unit 123 receives information from a user. When information is received through the user input unit 123, the processor 180 may control operations of the AI device 100 so as to correspond to the input information.

The user input unit 123 may include a mechanical input element (for example, a mechanical key, a button located on a front and/or rear surface or a side surface of the AI device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may learn a model composed of an artificial neural network by using training data. The learned artificial neural network may be referred to as a learning model. The learning model may be used to infer a result value for new input data rather than learning data, and the inferred value may be used as a basis for determination to perform a certain operation.

At this time, the learning processor 130 may perform AI processing together with the learning processor 240 of the AI server 200. At this time, the learning processor 130 may include a memory that is integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, or user information by using various sensors. Examples of the sensors included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to sight, hearing, or touch. At this time, the output unit 150 may include a display for outputting time information, a speaker for outputting auditory information, and a haptic module for outputting haptic information. The output unit 150 may include at least one of a display unit 151, a sound output unit 152, a haptic module 153, or an optical output unit 154.

The display unit 151 displays (outputs) information processed by the AI device 100. For example, the display unit 151 may display execution screen information of an application program driven in the AI device 100 or user interface (UI) and graphic user interface (GUI) information according to the execution screen information. The display unit 151 may implement a touch screen by forming a mutual layer structure with the touch sensor or being integrally formed with the touch sensor. The touch screen may function as the user input unit 123 providing an input interface between the AI device 100 and the user, and may also provide an output interface between the AI device 100 and the user.

The sound output unit 152 may output audio data received from the communication unit 110 or stored in the memory 170 in a call signal reception mode, a call mode, a record mode, a voice recognition mode, a broadcast reception mode, and the like. The sound output unit 152 may include at least one of a receiver, a speaker, or a buzzer.

The haptic module 153 generates various tactile effects that a user can feel. A representative example of the tactile effect generated by the haptic module 153 may be vibration.

The optical output unit 154 may output a signal for indicating event generation using light of a light source of the AI device 100. Examples of events generated in the AI device 100 may include message reception, call signal reception, a missed call, an alarm, a schedule notice, email reception, information reception through an application, and the like.

The memory 170 may store data that supports various functions of the AI device 100. For example, the memory 170 may store input data, learning data, a learning model, a learning history, and the like, which are acquired from the input unit 120.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation. When the connection of an external device is required to perform the determined operation, the processor 180 may generate a control signal for controlling the external device and may transmit the generated control signal to the external device.

The processor 180 may acquire intent information for the user input and may determine the user's requirements based on the acquired intent information. At this time, the processor 180 may acquire the intent information corresponding to the user input by using at least one of a speech to text (STT) engine for converting speech input into a text string or a natural language processing (NLP) engine for acquiring intent information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
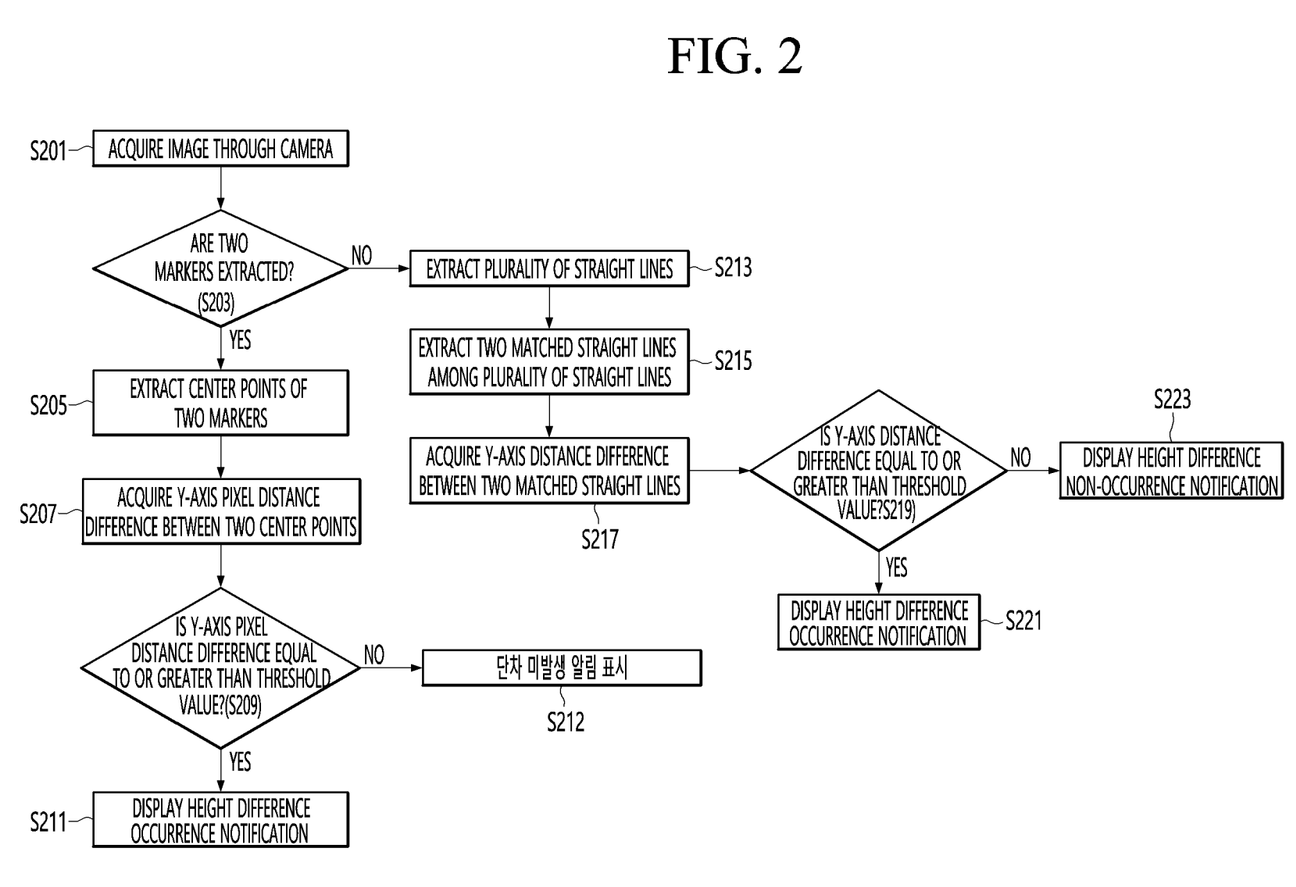
FIG. 2 is a flowchart of a method for estimating a height difference of a mobile terminal according to an embodiment of the present disclosure.

FIG. 2 is a flowchart of a method for estimating a height difference of a mobile terminal according to an embodiment of the present disclosure. For example, FIG. 2 illustrates an embodiment for describing a method for estimating a height difference between two adjacent doors provided in a home appliance.

Referring to FIG. 2, the processor 180 of the mobile terminal 100 acquires an image captured by the camera 121 (S201). The captured image may include images of two adjacent doors included in the home appliance. After delivery of the home appliance, a delivery driver who delivers the home appliance may photograph adjacent doors in order to check whether the home appliance is level.

The mobile terminal 100 may have a height difference estimation application installed thereon. The height difference estimation application is an application for estimating the height difference between the doors of the home appliance, and the camera 121 may be activated according to the execution of the height difference estimation application.

The processor 180 determines whether two markers have been extracted from the acquired image (S203). Markers may or may not be attached to the two adjacent doors. The marker may be an identifier used to measure the height difference between the doors.

Figure 3:
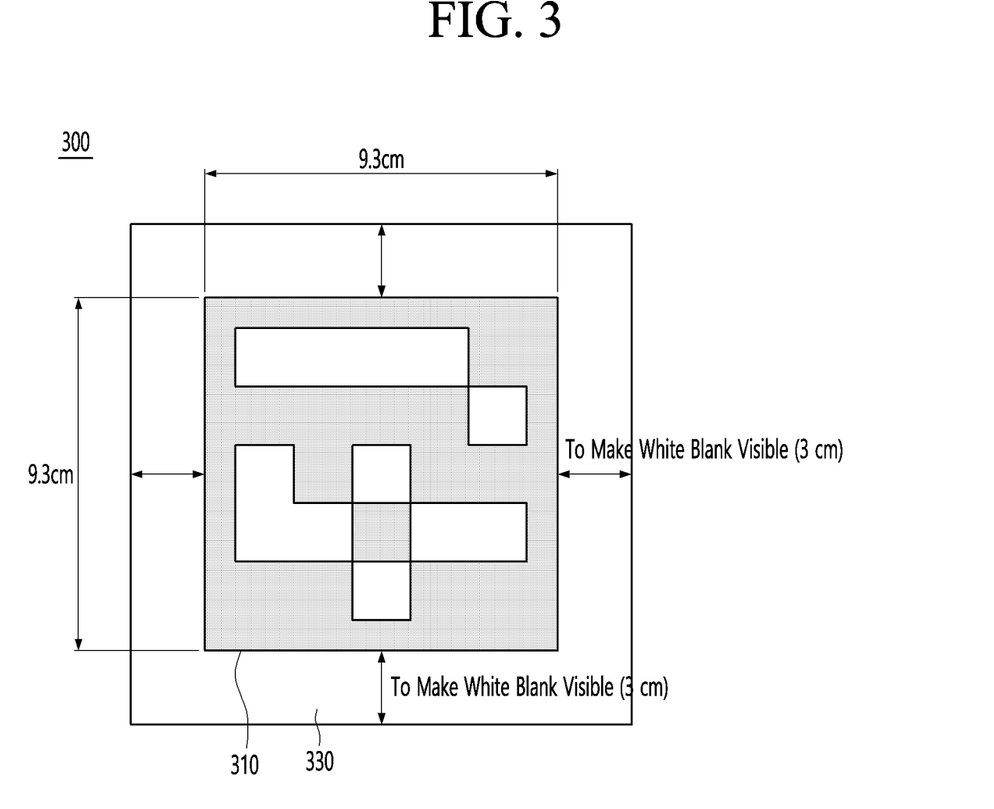
FIG. 3 is a diagram for describing a marker attached to a door of a home appliance according to an embodiment of the present disclosure.

The marker attached to the door will be described with reference to FIG. 3. FIG. 3 is a diagram for describing a marker attached to a door of a home appliance according to an embodiment of the present disclosure.

Referring to FIG. 3, an example of a marker 300 attachable to a door of a home appliance is shown. The marker 300 is a sticker-type marker and may be attached to the upper end of the door.

The marker 300 may include a marker area 310 and a blank area 330. The marker 300 may refer to only the marker area 310. That is, the marker area 310 itself may be a marker.

The marker area 310 may have a square shape. When the marker area 310 has a square shape, the length of one side of the marker area 310 may be 9.3 cm, but this is only an example.

The marker area 310 may include a plurality of pixels. Each of the plurality of pixels may also have a square shape.

The mobile terminal 100 may prestore the length of one side of each pixel in the memory 170. The length of one side of the unit pixel may be used to estimate the height difference between the doors.

Again, FIG. 2 is described. When the two markers are extracted, the processor 180 extracts a center point of each of the two markers (S205). The processor 180 may extract a center point of the marker area 310 illustrated in FIG. 3.

The processor 180 acquires a y-axis pixel distance difference between the two extracted center points (S207). The processor 180 may calculate a y-axis pixel distance difference between two center points by using the length of one side of the pixel stored in the memory 170.

The processor 180 determines whether the obtained y-axis pixel distance difference is equal to or greater than a threshold value (S209). The threshold value may be a value sufficient to consider that the height difference between the doors does not occur. The threshold value may be different for each type of home appliance.

When the acquired y-axis pixel distance difference is equal to or greater than the threshold value, the processor 180 determines that the height difference has occurred between the doors, and displays a height difference occurrence notification through the display unit 151 (S211).

According to an embodiment, the height difference occurrence notification may include text indicating that the height difference has occurred between the doors. The height difference occurrence notification may further include a value of the measured height difference.

In another embodiment, the height difference occurrence notification may be output through the sound output unit 152. When the acquired y-axis pixel distance difference is less than the threshold value, the processor 180 determines that the height difference has not occurred between the doors, and displays a height difference non-occurrence notification through the display unit 151 (S212).

The height difference non-occurrence notification may include text indicating that the height difference has not occurred between the doors. The height difference non-occurrence notification may further include a value of the measured height difference.

In another embodiment, the height difference non-occurrence notification may be output through the sound output unit 152. On the other hand, when the two markers are not extracted, the processor 180 extracts a plurality of straight lines from the image (S213). Each of the plurality of straight lines may be a straight line constituting an upper edge of each door.

The process of extracting the straight line constituting the upper edge of each door will be described below. The processor 180 extracts two matched straight lines from the plurality of extracted straight lines (S215). The processor 180 may extract a first matched straight line of an upper edge of a left door and a second matched straight line of an upper edge of a right door.

The processor 180 acquires a y-axis distance difference between the two matched straight lines (S217). The processor 180 may acquire a y-axis distance difference between the first matched straight line and the second matched straight line. The processor 180 may acquire the y-axis distance difference as a height difference between the left door and the right door. Thereafter, the processor 180 determines whether the y-axis distance difference is equal to or greater than a threshold value (S219).

When the y-axis pixel distance difference is equal to or greater than the threshold value, the processor 180 displays a height difference occurrence notification (S221). When the y-axis pixel distance difference is less than the threshold value, the processor 180 displays a height difference non-occurrence notification (S223).

As described above, according to an embodiment of the present disclosure, it is possible to easily determine the height difference between the doors only by one capture, so that the installation time of the home appliance installer can be greatly reduced.

FIGS. 4 to 8 are diagrams for describing an example of estimating a height difference of a home appliance by using markers attached to doors of the home appliance according to an embodiment of the present disclosure.

Hereinafter, it is assumed that the home appliance is a refrigerator 200. However, the present disclosure is not limited thereto. That is, the embodiment of the present disclosure may be applied to a case where a height difference between doors or a height difference between devices in a dishwasher, a washing machine, and a dryer tower occurs.

Figure 4:
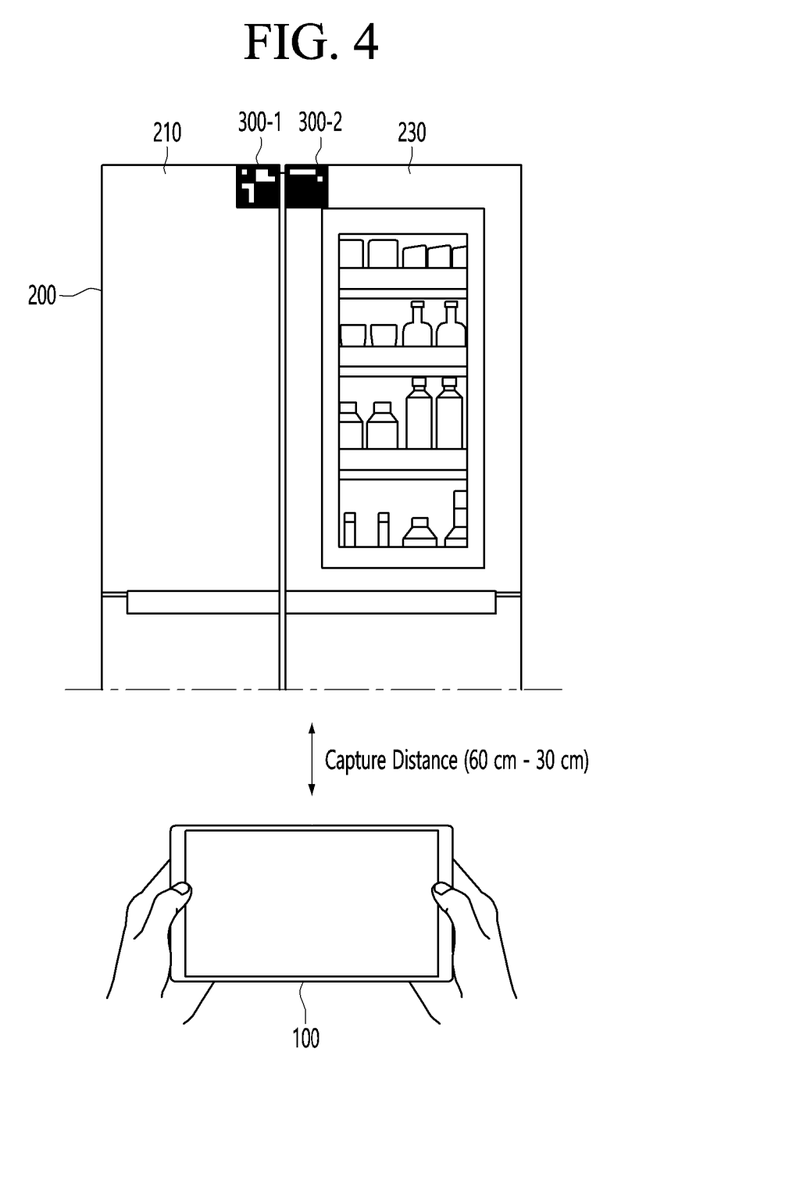
FIGS. 4 to 8 are diagrams for describing an example of estimating a height difference of a home appliance by using markers attached to doors of the home appliance according to an embodiment of the present disclosure.

Referring to FIG. 4, the refrigerator 200 may include a left door 210 and a right door 230.

A first marker (or a left marker) 300-1 is attached to the upper right of the left door 210, and a second marker (or a right marker) 300-2 is attached to the upper left of the right door 230.

The left door 210 and the right door 230 may be disposed spaced apart from each other by a predetermined distance. Accordingly, the first marker 300-1 and the second marker 300-2 may be disposed spaced apart from each other by a predetermined distance. A delivery driver may use the mobile terminal 100 to take a picture so that the first marker 300-1 and the second marker 300-2 are included in a preview screen.

Figure 5:
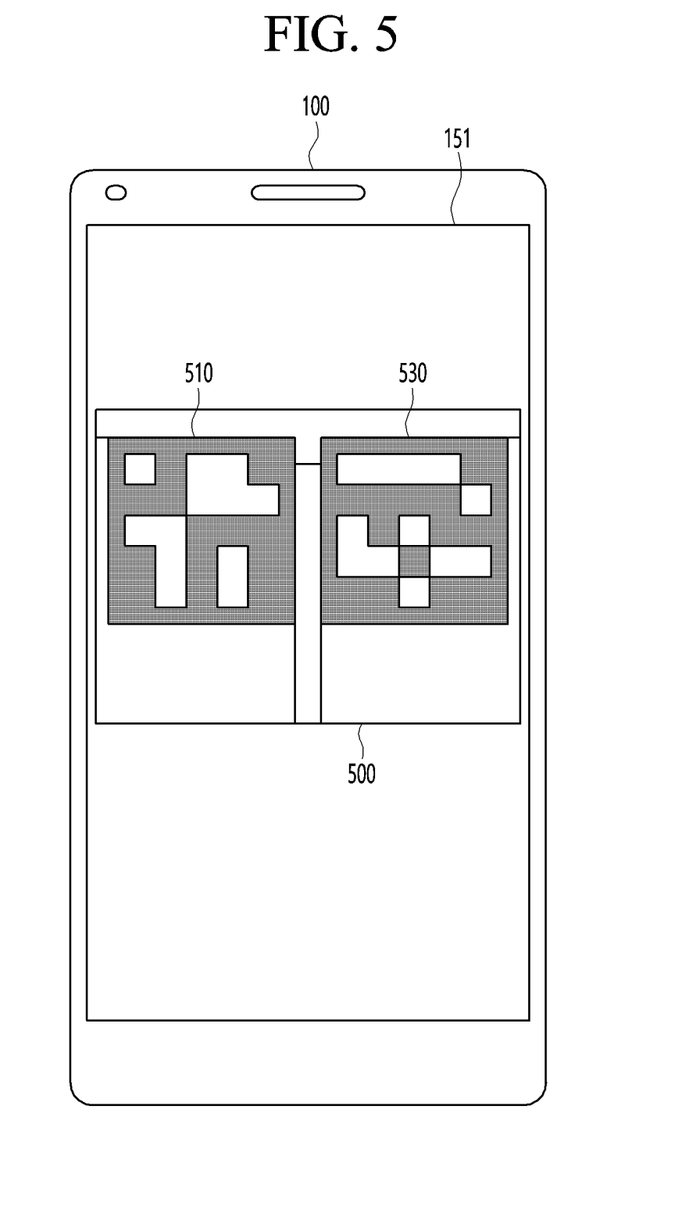

FIG. 5 illustrates a captured image 500 displayed on the display unit 151 of the mobile terminal 100. The image 500 may include a first marker image 510 corresponding to the first marker 300-1 and a second marker image 530 corresponding to the second marker 300-2. The processor 180 may extract a center point of the first marker image 510 and a center point of the second marker image 530.

Figure 6:
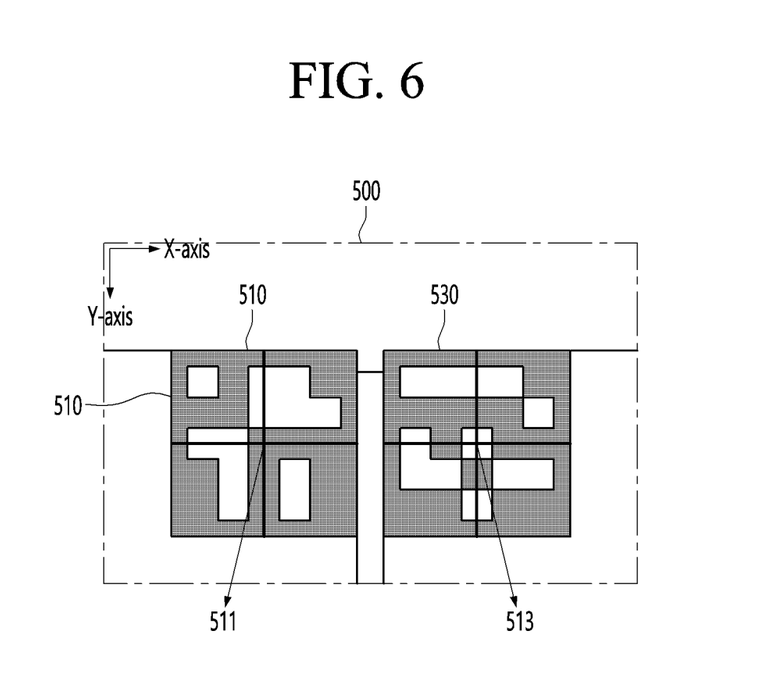

Referring to FIG. 6, the processor 180 may estimate a posture of the first marker image 510 and a posture of the second marker image 530. The first marker 300-1 and the second marker 300-2 may have a square shape. Accordingly, the first marker image 510 corresponding to the first marker 300-1 and the second marker image 530 corresponding to the second marker 300-2 may also have a square shape.

The processor 180 may acquire the center of each marker image as the center point of each marker. The memory 170 may prestore the length (93 mm) of one side of the marker and the number of pixels (71 pixels) constituting the marker.

The length of one side of the pixel may be calculated as 93/71 (mm). The length of one side of the pixel may also be prestored in the memory 170. Accordingly, if only the y-axis pixel distance difference between the two center points is known, the height difference between the markers can be calculated. The y-axis pixel distance difference may be an expression of y-axis difference between two center points with the number of pixels.

For example, if the pixel distance difference between a first center point 511 of the first marker image 510 and a second center point 513 of the second marker image 530 is 1.5, the height difference between the two markers may be calculated as 1.5×(93/71)(mm).

Figure 7:
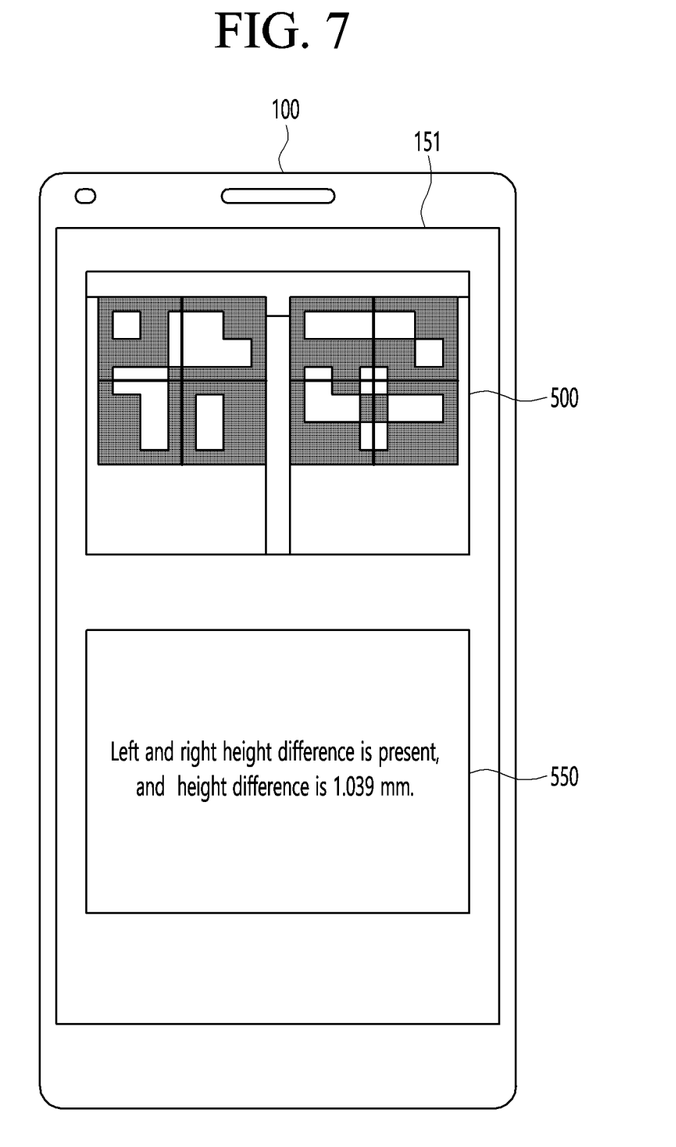

Referring to FIG. 7, the display unit 151 of the mobile terminal 100 may display the captured image 500 and a height difference occurrence notification 550. The height difference occurrence notification 550 may include text indicating the presence of the height difference between the left and right doors and a value of the calculated height difference.

Figure 8:
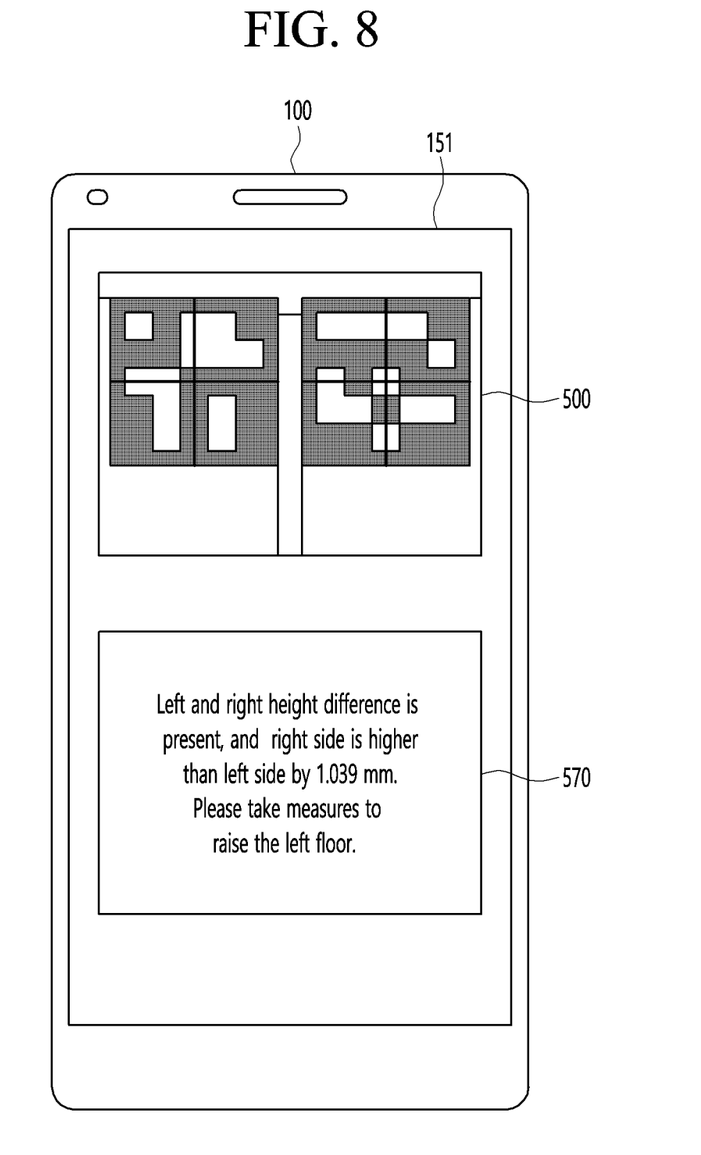

Referring to FIG. 8, a height difference occurrence notification 570 according to still another embodiment may be displayed. The height difference occurrence notification 570 may include text indicating the presence of the height difference between the left and right doors, a value of the calculated height difference, and an adjustment guide for resolving the height difference.

As described above, according to an embodiment of the present disclosure, it can be checked whether the height difference between the doors of the home appliance occurs only by one capture through the camera 121. Accordingly, the load of the installer may be reduced by reducing the installation time of the home appliance. In addition, as the guide is provided according to the occurrence of the door height difference, the defect rate of the door height difference is improved, and thus the cost for quality improvement can be reduced.

FIGS. 9 to 14 are diagrams for describing a process of estimating a height difference between doors when a marker is not present on a door of a home appliance according to an embodiment of the present disclosure.

Figure 9:
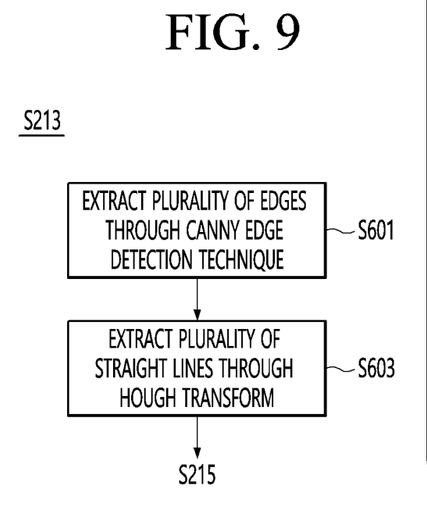
FIGS. 9 to 14 are diagrams for describing a process of estimating a height difference between doors when a marker is not present on a door of a home appliance according to an embodiment of the present disclosure.

In FIG. 9, it is assumed that the home appliance is a refrigerator. In particular, FIG. 9 is a flowchart for describing operation S213 in detail.

The processor 180 extracts a plurality of edges from the image by using a Canny edge detection technique (S601). The Canny edge detection technique may be a technique for extracting edges and contours from an image.

The Canny edge detection technique can cancel noise from an image through a Gaussian filter, can acquire a size of a gradient using a Sobel filter, can remove a false reaction from an edge detector by using non-maximum suppression, and can extract a plurality of edges through a double threshold method and hysteresis thresholding for extracting probable pixels from an edge. Since the Canny edge detection technique is a known technique, a detailed description thereof will be omitted.

The processor 180 extracts a plurality of straight lines from the plurality of extracted edges by using Hough transform (S603). The Hough transform may be a technique for extracting straight lines by finding correlations between specific points of an image. Since the Hough transform is a known technology, a detailed description thereof will be omitted.

The processor 180 may select two matched straight lines respectively corresponding to the left door and the right door from among the plurality of extracted straight lines. The processor 180 may extract a first matched straight line from a first straight line group constituting the upper edge of the left door.

The processor 180 may extract a second matched straight line from a second straight line group constituting the upper edge of the right door. The processor 180 may calculate a y-axis pixel distance difference between the first matched straight line and the second matched straight line. This will be described below in detail.

Figure 10:
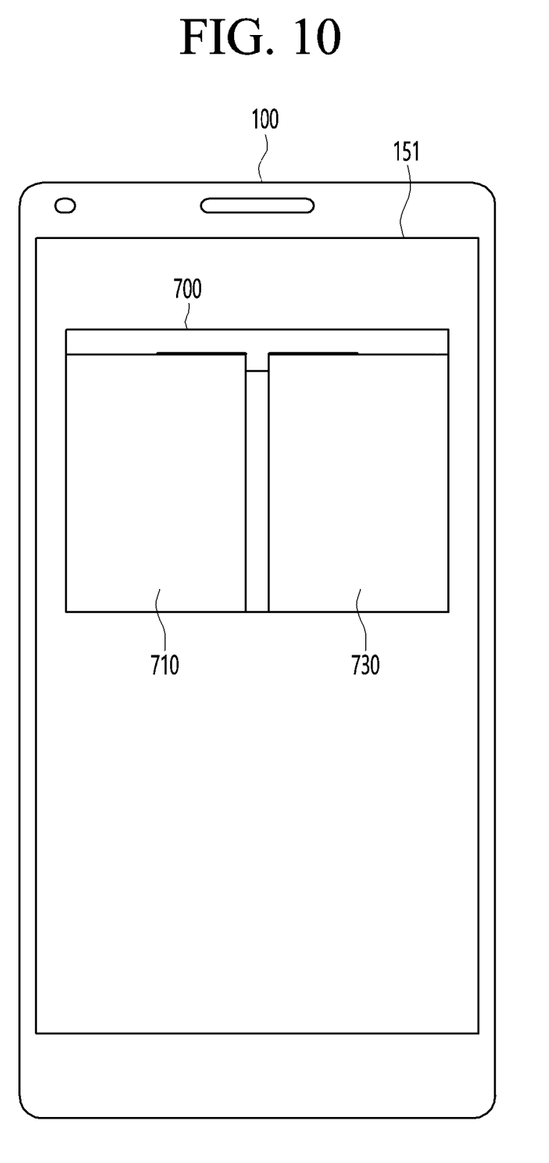

Referring to FIG. 10, the display unit 151 of the mobile terminal 100 may display an image 700 of a refrigerator to which a marker is not attached. The image may include a left door image 710 and a right door image 730. The processor 180 may use the Canny edge detection technique to extract upper edges of the left door image 710 and extract upper edges of the right door image 730.

Figure 11:
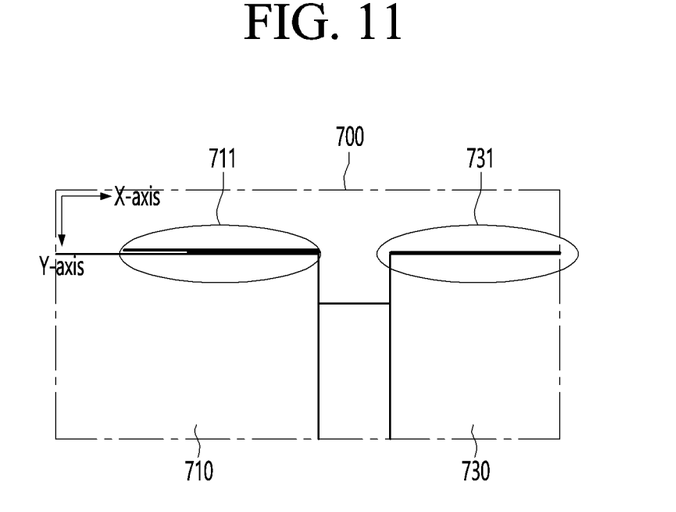

As illustrated in FIG. 11, the processor 180 may use the Hough transform technique to extract a first straight line group 711 including a plurality of straight lines from the upper edges of the left door image 710 and to extract a second straight line group 731 including a plurality of straight lines from the upper edges of the right door image 730.

Figure 12:
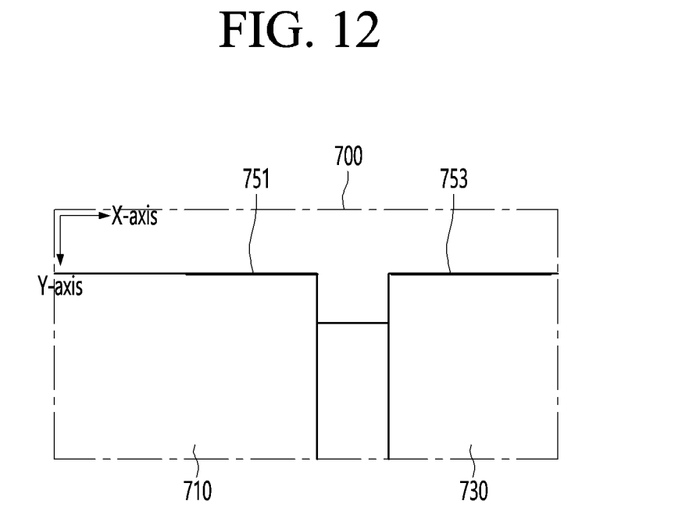

As illustrated in FIG. 12, the processor 180 may extract a first matched straight line 751 from the first straight line group 711 and extract a second matched straight line 753 from the second straight line group 731. The processor 180 may calculate an average value of y-axis values of both end points of the plurality of straight lines included in the first straight line group 711, and may extract, as the first matched straight line 751, a straight line having the calculated average value as the y-axis value.

The processor 180 may calculate an average value of y-axis values of both end points of the plurality of straight lines included in the second straight line group 731, and may extract, as the second matched straight line 753, a straight line having the calculated average value as the y-axis value.

The processor 180 may acquire a difference in y-axis values between the first matched straight line 751 and the second matched straight line 753 as a height difference between the left and right doors. When the acquired height difference exceeds a threshold value, the processor 180 may display a height difference occurrence notification on the display unit 151.

Figure 13:
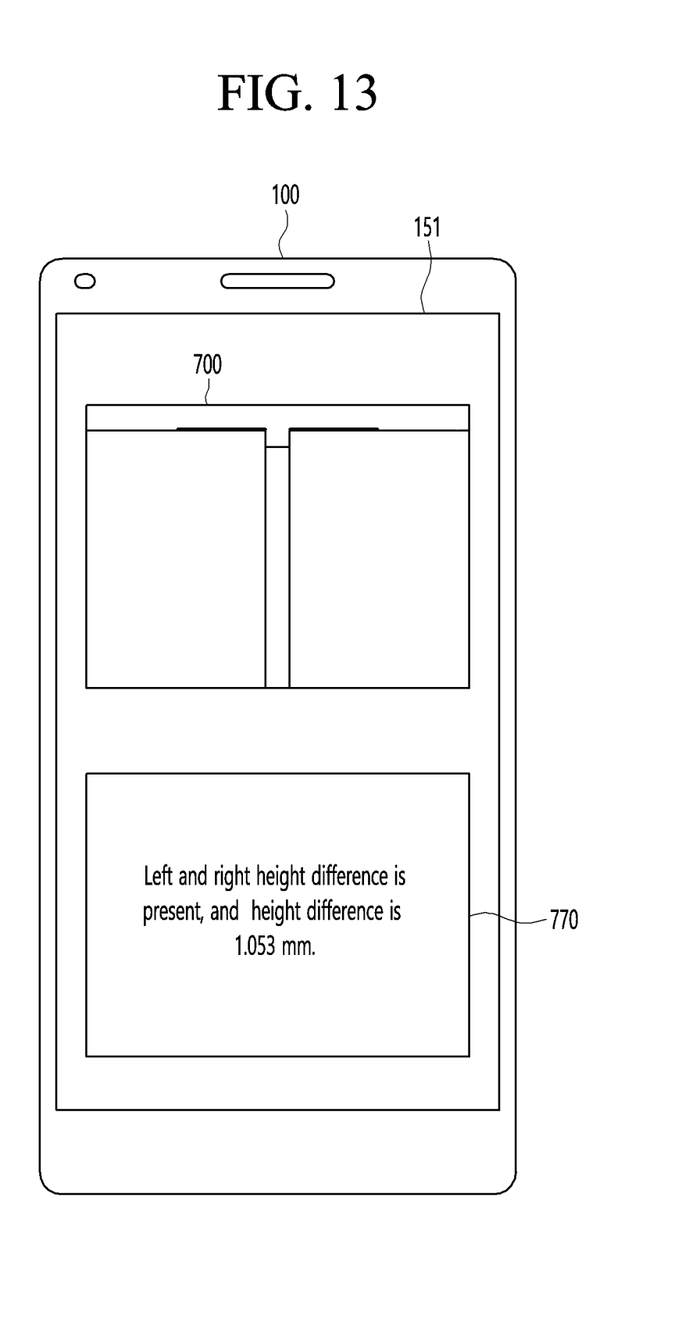

Referring to FIG. 13, the display unit 151 of the mobile terminal 100 displays the image 700 and the height difference occurrence notification 770. The height difference occurrence notification 770 may include text indicating the presence of the left and right height difference and a value of the height difference.

Figure 14:
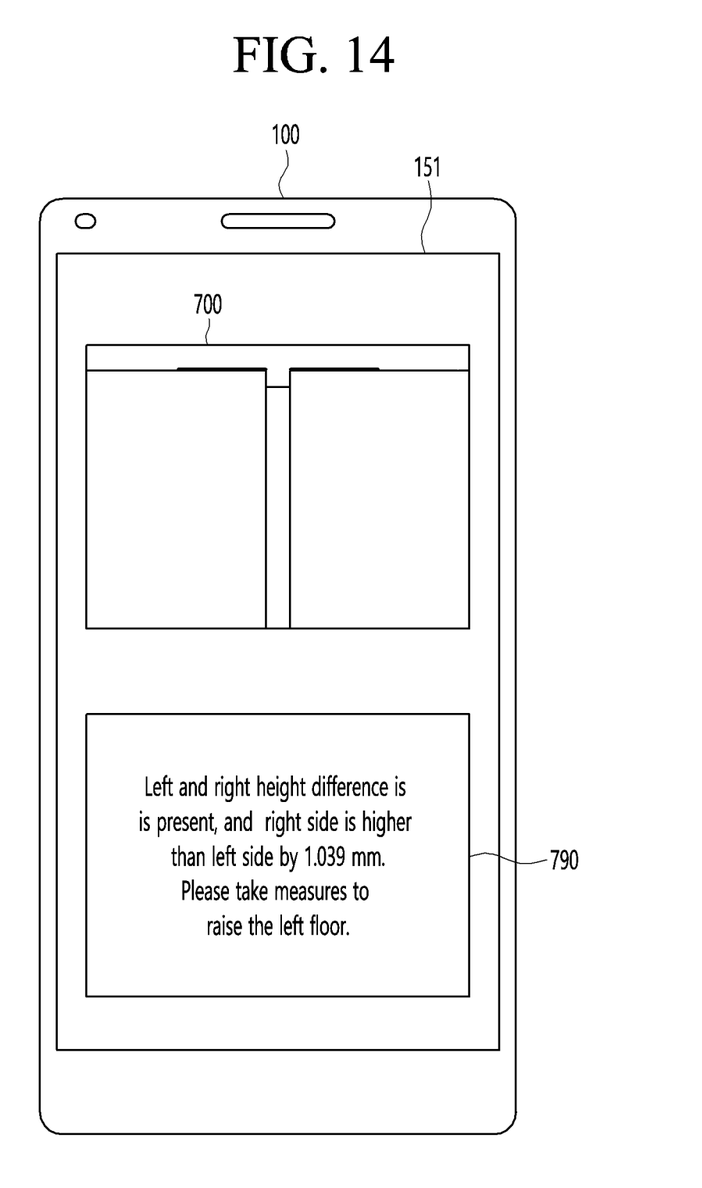

Referring to FIG. 14, another type of height difference occurrence notification 790 is shown. The height difference occurrence notification 790 may include text indicating the presence of the left and right height difference, a value of the height difference, and an adjustment guide for resolving the height difference.

As described above, according to an embodiment of the present disclosure, even if there are no markers on the doors of the home appliance, the height difference between the doors can be estimated only by one capture. Accordingly, the installation time taken for the installer to install the home appliance can be reduced, and the height difference can be extracted more accurately and quickly.

According to an embodiment of the present disclosure, a height difference is estimated only by one capture without a separate level aligner measurement, so that an installation convenience of an installer can be significantly improved. In addition, the installation time and actions for the installation of the home appliance are simplified, so that the installation load can be greatly reduced.

According to an embodiment of the present disclosure, the above-described method can be implemented with codes readable by a processor on a medium in which a program is recorded. Examples of the processor-readable medium may include read-only memory (ROM), random access memory (RAM), compact disc read-only memory (CD-ROM), magnetic tape, floppy disk, and optical data storage device.

The display device described above is not limitedly applicable to the configuration and method of the above-described embodiments, and the embodiments are configured by selectively combining all or part of each of the embodiments such that various modifications can be made.

The present disclosure aims to estimate a height difference of a home appliance only by one capture. The present disclosure aims to estimate a height difference of a home appliance by using marker information attached to the home appliance. The present disclosure aims to estimate a height difference based on a straight line component between doors even if marker information is not attached to a home appliance.

A mobile terminal according to an embodiment of the present disclosure may determine whether two markers attached to two doors are present from an image captured through a camera, acquire center points of the two markers when the two markers are present, acquire a y-axis pixel distance difference between the acquired center points, and estimate a height difference between the two doors based on the acquired y-axis pixel distance difference. The mobile terminal according to an embodiment of the present disclosure may calculate the height difference by multiplying the y-axis pixel distance difference between the center points by a length of the unit pixels.

The mobile terminal according to an embodiment of the present disclosure may extract upper edges of the two doors, extract a plurality of straight lines from the extracted upper edges, extract a first matched straight line corresponding to a first door and a second matched straight line corresponding to a second door from the plurality of extracted straight lines, and estimate, as the height difference, a y-axis distance difference between the first matched straight line and the second matched straight line.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a camera;
a processor configured to:
determine whether two markers attached, respectively, to two doors are present in an image captured through the camera;
when the two markers are determined to be present in the image, acquire center points of the two markers;
acquire a y-axis pixel distance difference between the acquired center points; and
estimate a height difference between the two doors based on the acquired y-axis pixel distance difference,
wherein the processor, when the two markers are determined to be not present in the image, is configured to:
extract upper edges of the two doors from the image;
extract a plurality of straight lines from the extracted upper edges;
extract a first matched straight line corresponding to a first door and a second matched straight line corresponding to a second door from the plurality of extracted straight lines; and
estimate, as the height difference, a y-axis distance difference between the first matched straight line and the second matched straight line.

2. The mobile terminal of claim 1,
wherein one of the markers comprises a plurality of unit pixels, and
wherein the processor is configured to calculate the height difference based on multiplying the y-axis pixel distance difference between the center points by a length of one of the unit pixels.

3. The mobile terminal of claim 2, further comprising a memory configured to store the length of the one of the unit pixels included in the marker.

4. The mobile terminal of claim 1, further comprising:
a display unit,
wherein the processor is configured to:
when the height difference is equal to or greater than a threshold value, display a height difference occurrence notification on the display unit; and
when the height difference is less than the threshold value, display a height difference non-occurrence notification on the display unit.

5. The mobile terminal of claim 4,
wherein the height difference occurrence notification comprises a value of the estimated height difference and an adjustment guide for adjusting the height difference.

6. The mobile terminal of claim 1,
wherein the processor is configured to:
extract the upper edges by using a Canny edge detection technique; and
extract the plurality of straight lines from the extracted upper edges by using a Hough transform technique.

7. The mobile terminal of claim 6,
wherein the processor is configured to:
extract, as the first matched straight line, a first straight line corresponding to an average value of y-axis values of both end points of straight lines corresponding to an upper end of the first door among the plurality of straight lines; and
extract, as the second matched straight line, a second straight line corresponding to an average value of y-axis values of both end points of straight lines corresponding to an upper end of the second door among the plurality of straight lines.

8. An operating method of a mobile terminal, the operating method comprising:
acquiring an image of a home appliance through a camera;
determining whether two markers attached to two doors are present in the acquired image;
when the two markers are determined to be present, acquiring center points of the two markers;
acquiring a y-axis pixel distance difference between the acquired center points; and
estimating a height difference between the two doors based on the acquired y-axis pixel distance difference,
wherein the method further comprises:
extracting, when the two markers are determined not to be present in the image, upper edges of the two doors from the image;
extracting a plurality of straight lines from the extracted upper edges;
extracting a first matched straight line corresponding to a first door and a second matched straight line corresponding to a second door from the plurality of extracted straight lines; and
estimating, as the height difference, a y-axis distance difference between the first matched straight line and the second matched straight line.

9. The method of claim 8,
wherein one of the markers comprises a plurality of unit pixels, and
wherein estimating the height difference between the two doors includes multiplying the y-axis pixel distance difference between the center points by a length of one of the unit pixels.

10. The method of claim 8, further comprising:
when the height difference is equal to or greater than a threshold value, displaying a height difference occurrence notification; and
when the height difference is less than the threshold value, displaying a height difference non-occurrence notification.

11. The method of claim 10, wherein the height difference occurrence notification includes a value of the estimated height difference and an adjustment guide for adjusting the height difference.

12. The method of claim 8, wherein the method further comprises:
extracting the upper edges by using a Canny edge detection technique; and
extracting the plurality of straight lines from the extracted upper edges by using a Hough transform technique.

13. The method of claim 12, further comprising: extracting, as the first matched straight line, a first straight line corresponding to an average value of y-axis values of both end points of straight lines corresponding to an upper end of the first door among the plurality of straight lines; and
extracting, as the second matched straight line, a second straight line corresponding to an average value of y-axis values of both end points of straight lines corresponding to an upper end of the second door among the plurality of straight lines.

14. A non-transitory computer-readable storage medium for storing instructions causing a processor to execute an operating method of a mobile terminal, the operating method comprising:

acquiring an image of a home appliance;

determining, based on the image, whether two markers attached to two doors, respectively;

when the two markers are determined to be attached to the two doors, acquiring center points of the two markers;

acquiring a pixel distance difference between the acquired center points in a height direction; and estimating a height difference between the two doors based on the acquired pixel distance difference, wherein the operating method further comprises:

extracting, when the two markers are determined not to be attached to the doors, upper edges of the two doors from the image;

extracting a plurality of straight lines from the extracted upper edges;

extracting a first matched straight line corresponding to a first door and a second matched straight line corresponding to a second door from the plurality of extracted straight lines; and     estimating, as the height difference, a distance difference between the first matched straight line and the second matched straight line.

15. The non-transitory computer-readable storage medium of claim 14, wherein one of the markers comprises a plurality of unit pixels, and wherein estimating the height difference between the two doors includes multiplying the pixel distance difference between the center points by a length of one of the unit pixels.

16. The non-transitory computer-readable storage medium of claim 14, wherein the operating method further comprises:

when the height difference is equal to or greater than a threshold value, displaying a height difference occurrence notification on the display unit; and     when the height difference is less than the threshold value, displaying a height difference non-occurrence notification on the display unit.

17. The non-transitory computer-readable storage medium of claim 14, wherein the operating method further comprises:

extracting, as the first matched straight line, a first straight line corresponding to an average height value of both end points of straight lines corresponding to an upper end of the first door among the plurality of straight lines; and     extracting, as the second matched straight line, a second straight line corresponding to an average height value of both end points of straight lines corresponding to an upper end of the second door among the plurality of straight lines.

* * * * *